United States Patent
Feng et al.

(10) Patent No.: US 9,704,453 B2
(45) Date of Patent: Jul. 11, 2017

(54) PICTURE DISPLAY METHOD AND APPARATUS

(71) Applicants: Hisense USA Corp., Suwanee, GA (US); Hisense Electric Co., Ltd., Qingdao, Shandong (CN); Hisense International Co., Ltd., Qingdao, Shandong (CN)

(72) Inventors: Weina Feng, Qingdao (CN); Huanjie Zhao, Qingdao (CN); Xianjian Wang, Qingdao (CN)

(73) Assignees: Hisense Electric Co., Ltd., Qingdao, Shandong (CN); Hisense USA Corp., Suwanee, GA (US); Hisense International Co., Ltd., Qingdao, Shandong (CN)

( * ) Notice: Subject to any disclaimer, the term of this patent is extended or adjusted under 35 U.S.C. 154(b) by 79 days.

(21) Appl. No.: 14/789,035

(22) Filed: Jul. 1, 2015

(65) Prior Publication Data
US 2016/0284318 A1    Sep. 29, 2016

(30) Foreign Application Priority Data
Mar. 23, 2015 (CN) .......................... 2015 1 0128185

(51) Int. Cl.
G06T 3/60    (2006.01)
G09G 5/22    (2006.01)
G06T 3/40    (2006.01)

(52) U.S. Cl.
CPC .......... *G09G 5/227* (2013.01); *G06T 3/4092* (2013.01); *G06T 3/60* (2013.01)

(58) Field of Classification Search
None
See application file for complete search history.

(56) References Cited

U.S. PATENT DOCUMENTS

| | | | |
|---|---|---|---|
| 2006/0007328 A1* | 1/2006 | Paulsen | G11B 27/034 348/239 |
| 2006/0041564 A1* | 2/2006 | Jain | G06F 17/30997 |
| 2009/0212113 A1* | 8/2009 | Chiu | G06K 7/14 235/462.41 |
| 2011/0069179 A1* | 3/2011 | Bathiche | H04N 5/23206 348/207.1 |

(Continued)

Primary Examiner — Delomia L Gilliard
(74) Attorney, Agent, or Firm — Brinks Gilson & Lione

(57) ABSTRACT

The present disclosure provides a picture display method and apparatus that relate to the field of image processing and are increase flexibility of picture display and reducing a memory occupation rate of a terminal on the premise of not modifying an attribute of an original picture. The method and apparatus include receiving an instruction for displaying a picture; obtaining, according to an identifier of a to-be-displayed picture included in the instruction, an original bitmap of the to-be-displayed picture and searching, a database of a current device for a pre-stored first rotation angle corresponding to the to-be-displayed picture; adjusting, according to a resolution of a current screen and/or a current window size, a display size of the original bitmap of the to-be-displayed picture, so as to obtain a compressed bitmap of the original bitmap; and displaying, according to the first rotation angle, a compressed bitmap of the original bitmap.

17 Claims, 6 Drawing Sheets

(56) References Cited

U.S. PATENT DOCUMENTS

| | | | | |
|---|---|---|---|---|
| 2011/0157231 | A1* | 6/2011 | Ye | G09G 3/20 |
| | | | | 345/649 |
| 2011/0285749 | A1* | 11/2011 | Nielsen | G06F 17/30241 |
| | | | | 345/629 |
| 2011/0289098 | A1* | 11/2011 | Oztaskent | G06F 17/30026 |
| | | | | 707/769 |
| 2012/0162227 | A1* | 6/2012 | Chou | G09G 5/391 |
| | | | | 345/428 |
| 2013/0265447 | A1* | 10/2013 | Sun | H04N 1/00204 |
| | | | | 348/207.1 |
| 2014/0191945 | A1* | 7/2014 | Wang | G06F 1/1601 |
| | | | | 345/156 |
| 2015/0077511 | A1* | 3/2015 | Mihara | H04N 7/147 |
| | | | | 348/14.12 |
| 2015/0177848 | A1* | 6/2015 | Jung | G06F 3/0482 |
| | | | | 715/810 |
| 2015/0324678 | A1* | 11/2015 | Simske | G06K 19/06037 |
| | | | | 235/375 |
| 2016/0104457 | A1* | 4/2016 | Wu | G09G 5/39 |
| | | | | 345/522 |

* cited by examiner

PICTURE DISPLAY METHOD AND APPARATUS

PRIORITY STATEMENT

This application claims the priority benefit of Chinese Patent Application No. 201510128185.9 filed on Mar. 23, 2015, the disclosure of which is incorporated herein in its entirety by reference.

BACKGROUND

Technical Field

The present disclosure relates to the field of image processing, and in particular, to a picture display method and apparatus.

Related Art

When an electronic device, such as a TV, displays a picture with different orientation, the electronic device generally rotate the picture and resizes the rotated picture into a required resolution. When a great number of high-definition pictures (for example, a picture having high-definition display resolution, such as 4K2K) are rotated and displayed at the predetermined resolution, however, a lot of memory resources of the electronic device would be consumed, and phenomena, such as a pause and a delay, would occur to the electronic device in processes of loading a picture and displaying a picture. Here, the 4K2K is an abbreviation for an ultra high-definition format having a 3840×2160 physical resolution.

Currently existing picture display methods have the following defects:

Firstly, the current picture display methods rotate and resize the original picture by modifying an attribute of an original bitmap of the picture, and the resizing of the original bitmap is conducted after the rotation operation; because an original bitmap (also referred to as a lattice image) of a picture is constituted by respective pixels, the original bitmap is large and needs to occupy a lot of memory when being loaded and displayed; in addition, the methods would also modify an attribute of the original bitmap, so that the picture would also be displayed on another terminal device according to the modified attribute and size; in view of the above, an attribute of the picture is modified according to a screen resolution of a current device and a window size, but because the screen resolution of the current device may not be the most optimal, a resolution and a definition of the picture might be reduced, thereby affecting a visual effect for a user.

Secondly, when a user chooses to display a great number of pictures, in the existing picture display methods, attributes of all original bitmaps need to modified one by one and sizes of all the original bitmaps need to be adjusted one by one, which would occupy a lot of memory resources of a terminal device, thereby exerting negative influence on normal running of the terminal device; in addition, because the foregoing operations would cost a lot of time, the operations seriously shorten display time of a picture and reduces user experience.

SUMMARY

Exemplary embodiments of the present disclosure provide a picture display method and apparatus, and increase flexibility of picture display and reduce a memory occupation rate of a terminal on the premise of not modifying an attribute of an original picture.

The exemplary embodiments of the present disclosure provide a picture display method, including:
receiving an instruction display a picture;
obtaining, according to an identifier of a to-be-displayed picture included in the instruction, an original bitmap of the to-be-displayed picture and searching a database of a current device for a pre-stored first rotation angle corresponding to the to-be-displayed picture; and
adjusting, according to a resolution of a current screen and/or a size of a current window, a display size of the original bitmap of the to-be-displayed picture to obtain a compressed bitmap of the original bitmap; and displaying, according to the found first rotation angle, the compressed bitmap of the original bitmap.

The exemplary embodiments of the present disclosure further provide a picture display apparatus, including:
an instruction receiving unit, configured to receive an instruction display a picture;
a processing unit, configured to obtain, according to an identifier of a to-be-displayed picture included in the instruction, an original bitmap of the to-be-displayed picture and search a database of a current device for a pre-stored first rotation angle corresponding to the to-be-displayed picture; and
an adjusting and displaying unit, configured to adjust, according to a resolution of a current screen and/or a size of a current window, a display size of the original bitmap of the to-be-displayed picture to obtain a compressed bitmap of the original bitmap; and display, according to the first rotation angle, the compressed bitmap of the original bitmap.

In view of the foregoing technical solutions, after an instruction display a picture is received, an original bitmap of a to-be-displayed picture is obtained, and a database of a current device is searched for a pre-stored first rotation angle corresponding to the to-be-displayed picture; in this way, in the exemplary embodiments of the present disclosure, the original bitmap of the to-be-displayed picture is first compressed, so as to reduce a size of the to-be-displayed picture, and when later it turns out the electronic device needs to perform a rotation operation on the to-be-displayed picture, the compressed bitmap is directly rotated, and as compared with a manner of directly rotating the original bitmap in the current technology, the exemplary embodiments of the present disclosure effectively save the memory occupied in processes of loading, rotating, and displaying a picture and increase speeds of loading, rotating, and displaying the picture; further, in the exemplary embodiments of the present disclosure, the compressed bitmap of the original bitmap is rotated according to the first rotation angle, and the picture is displayed after the rotation operation. Hence, the rotation operation is performed on the compressed bitmap of the original bitmap, thereby avoiding phenomenon of consuming a lot of memory as the rotation operation is performed on the original bitmap in the current technology. Further, in the exemplary embodiments of the present disclosure, the first rotation angle is a parameter for adjusting, on the basis of a direction of a to-be-displayed picture, a display direction of the picture, the first rotation angle is stored in the database of the current device and does not replace an attribute of the to-be-displayed picture, and in this way, no matter how a user rotates a display direction of each picture, the attribute of the picture would not be modified, and therefore, an original resolution of the picture would not be reduced; hence a more flexible picture display method is provided on the premise of ensuring an original definition and resolution of the picture, thereby improving loading and displaying rates, lowering memory consumption, and reducing a memory occupation rate.

BRIEF DESCRIPTION OF THE DRAWINGS

To illustrate the technical solutions in the exemplary embodiments of the present disclosure more clearly, the accompanying drawings for describing the embodiments are introduced briefly below. Apparently, the accompanying drawings in the following description are only exemplary embodiments of the present disclosure, and persons of ordinary skill in the art can derive other drawings from the accompanying drawings without creative efforts.

DETAILED DESCRIPTION

Figure 1:
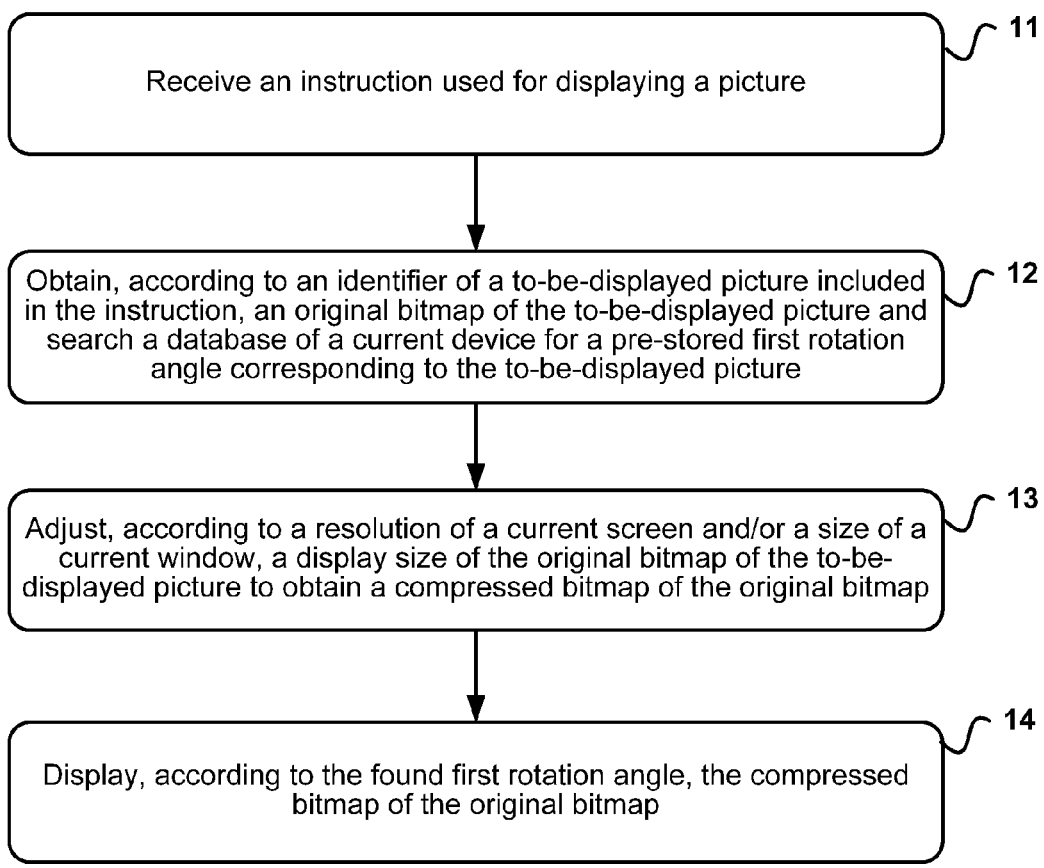
FIG. 1 is a flowchart of a picture display method according to an exemplary embodiment of the present disclosure.

To illustrate technology improvements, technical solutions, and advantages of the exemplary embodiments of the present disclosure clearer, the present disclosure is further described below in detail with reference to the accompanying drawings. Apparently, the described exemplary embodiments are a part rather than all of the embodiments of the present disclosure. All other embodiments obtained by a person of ordinary skill in the art based on the embodiments of the present disclosure without creative efforts shall fall within the protection scope of the present disclosure.

Embodiments of the present disclosure are applicable to different types of intelligent terminals and in particular, to terminal devices, such as smart phones and a smart TV, that are developed based on an Android system. The exemplary embodiments of the present disclosure provide a flexible and efficient fast synchronization method for image display and a thumbnail. The embodiments of the present disclosure propose an image rotation algorithm based on a current window; in addition, during image display, an angle is uniformly stored and managed in a database of a current device (for example, an intelligent terminal or a smart TV), once the database of the current device is removed, an image is displayed at an angle defined by an attribute thereof, so that rotation of the image is only based on the current device, and when the image is opened in another device, the image is displayed at the angle defined by the attribute of the another device; generally speaking, during an image rotation process, the image may be stretched according to a current screen, thereby reducing a resolution of the image; however, the embodiments of the present disclosure do not modify the angle in the attribute of the image, so as to provide a more flexible image rotation method while ensuring a resolution of the image at the same time. Meanwhile, in the embodiments of the present disclosure, the original bitmap of the to-be-displayed picture is first compressed, so as to reduce a size of the to-be-displayed picture, and when later it is necessary to perform a rotation operation on the to-be-displayed picture, the compressed bitmap is directly rotated, and as compared with a manner of directly rotating the original bitmap in the current technology, the embodiments of the present disclosure effectively save the memory occupied in processes of loading, rotating, and displaying a picture, and increase speeds of loading, rotating, and displaying the picture. In addition, based on the foregoing rotation solution, the embodiments of the present disclosure further propose a fast synchronization method for an image thumbnail, thereby avoiding a time-consuming operation of obtaining a thumbnail again.

It should be noted that in the embodiments of the present disclosure, a bitmap means a manner that a converted picture is saved in a terminal. Thus the bitmap in the embodiments of the present disclosure is a bitmap in the code of a picture rather than a picture of a certain type. It should also be noted that the embodiments of the present disclosure may be applied to pictures in various formats.

Figure 7:
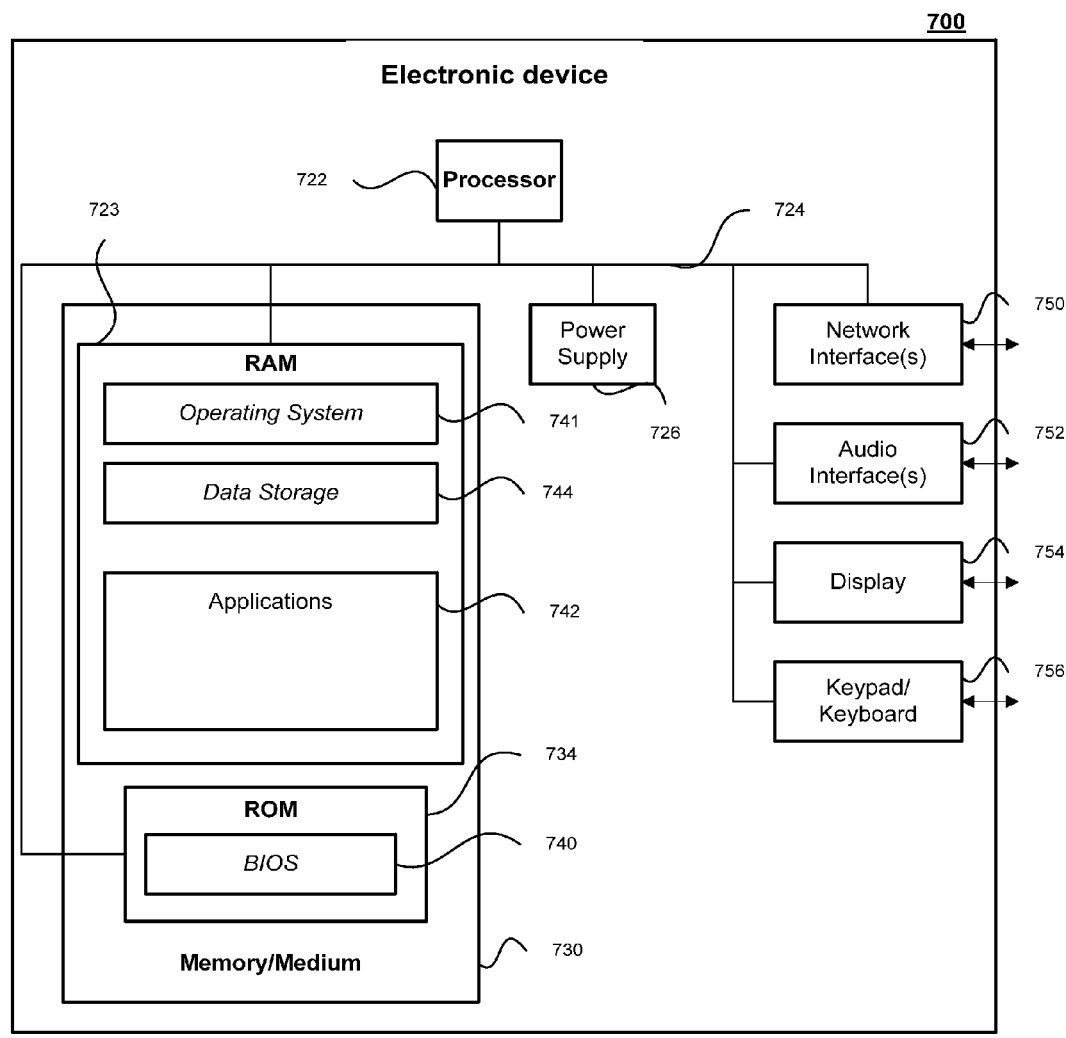
FIG. 7 is a schematic diagram illustrating an exemplary embodiment of an electronic device.

FIG. 7 is a schematic diagram illustrating an exemplary embodiment of an electronic device. The electronic device may include apparatuses to execute methods and software systems introduced in the present disclosure. An electronic device 700 may be a computing device capable of executing a software system. The electronic device 700 may, for example, be a device such as a smart TV, a personal desktop computer or a portable device, such as a laptop computer, a tablet computer, a cellular telephone, or a smart phone.

The electronic device 700 may vary in terms of capabilities or features. Claimed subject matter is intended to cover a wide range of potential variations. For example, the electronic device 700 may include a network interface 750, an audio interface 752, and a keypad/keyboard 756. It may also include a display 754, such as a liquid crystal display (LCD), or a display with a high degree of functionality, such as a touch-sensitive color 2D or 3D display. In contrast, however, as another example, a web-enabled electronic device 700 may include one or more physical or virtual keyboards, and mass storage medium 730.

The electronic device 700 may also include or may execute a variety of operating systems 741, including an operating system. The electronic device 700 may include or may execute a variety of possible applications 742, such as an electronic game 745. An application 742 may enable communication with other devices via a network, such as communicating with another computer via a network for online.

Further, the electronic device 700 may include one or more non-transitory processor-readable storage media 730 and one or more processors 722 in communication with the non-transitory processor-readable storage media 730. For example, the non-transitory processor-readable storage media 730 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 730 may store sets of instructions, or units and/or modules that include the sets of instructions, for conducting operations and/or method steps described in the present disclosure. Alternatively, the units and/or modules may be hardware disposed in the electronic device 700 configured to conduct operations and/or method steps described in the present disclosure. The one or more processors may be configured to execute the sets of instructions and perform the methods and/or operations in example embodiments of the present disclosure.

Merely for illustration, only one processor will be described in electronic devices that execute operations and/or method steps in the following example embodiments. However, it should be note that the electronic devices in the present disclosure may also include multiple processors, thus operations and/or method steps that are performed by one processor as described in the present disclosure may also be jointly or separately performed by the multiple processors. For example, if in the present disclosure a processor of an electronic device executes both step A and step B, it should be understood that step A and step B may also be performed by two different processors jointly or separately in the electronic device (e.g., the first processor executes step A and the second processor executes step B, or the first and second processors jointly execute steps A and B).

FIG. 1 is a flowchart of a picture display method according to an exemplary embodiment of the present disclosure, and as shown in FIG. 1, the process may be executed by an electronic device, such as a smart TV, and may include:

Step 11: Receiving an instruction to display a picture.

Step 12: Obtaining, according to an identifier of a to-be-displayed picture included in the instruction, an original bitmap of the to-be-displayed picture and searching a database of a current device for a pre-stored first rotation angle corresponding to the to-be-displayed picture.

Step 13: Adjusting, according to a resolution of a current screen and/or a size of a current window, a display size of the original bitmap of the to-be-displayed picture to obtain a compressed bitmap of the original bitmap.

Step 14: Displaying, according to the first rotation angle, the compressed bitmap of the original bitmap.

In the foregoing steps 11 to 14, the first rotation angle of the picture is stored or updated through the following steps: for a picture that has been displayed, after receiving a rotation instruction to adjust a second rotation angle of the picture that has been displayed, updating, according to a sum of the first rotation angle and second rotation angle of the image, the first rotation angle corresponding to the image in the database of the current device; for a picture that is not displayed, after receiving a rotation instruction to adjust a second rotation angle of the picture that is not displayed, searching the database of the current device for a pre-stored first rotation angle corresponding to the picture, and updating, according to a sum of the first rotation angle and second rotation angle of the picture, the first rotation angle corresponding to the picture in the database of the current device.

The foregoing step 14 may include performing, according to a calculated display angle, a picture rotation operation on the compressed bitmap of the original bitmap; adjusting, according to the resolution of the current screen and/or the size of the current window, a display size of the compressed bitmap of the original bitmap after the rotation operation, so as to obtain an adaptive window bitmap; and displaying the adaptive window bitmap.

The foregoing steps 11 to 13 may include, on the basis of an original bitmap of each picture and a preset scaling ratio, generating, according to a first rotation angle of each picture in the database of the current device, a thumbnail of each picture and saving the generated thumbnail in a pre-established picture cache.

The foregoing steps 11 to 13 may include obtaining, when it is necessary to display a thumbnail of a picture, the thumbnail of the picture from the picture cache and display the thumbnail of the picture.

The exemplary embodiments of the present disclosure are described in detail below.

The image display method according to the exemplary embodiment of the present disclosure may include an image rotation process, an image stretching process, an image display process, and a thumbnail update and display process. The exemplary embodiment of the present disclosure provides a novel image rotation manner, so as to implement rotation of an image only in a current display device without modifying an angle in an attribute of the image, thereby effectively preventing the image from being damaged during a use process; because the rotation of the image is no longer based on the original image per se, but based on a current window image, memory consumption of the rotation operation is ensured to be small; in addition, in the exemplary embodiment of the present disclosure, thumbnails of respective images may be uniformly stored in a picture cache LruCache, and after a rotation operation is performed, the angle after the rotation is used to rotate the thumbnails in the LruCache, so as to avoid obtaining original images again, thereby implement fast synchronization of the thumbnails. In view of the above, the exemplary embodiment of the present disclosure not only increases flexibility of image display and display, but also can protect an attribute of an image and ensure that a resolution of an original picture is not damaged, thereby improving a running speed of a current display end and reducing a memory occupation rate.

Figure 2:
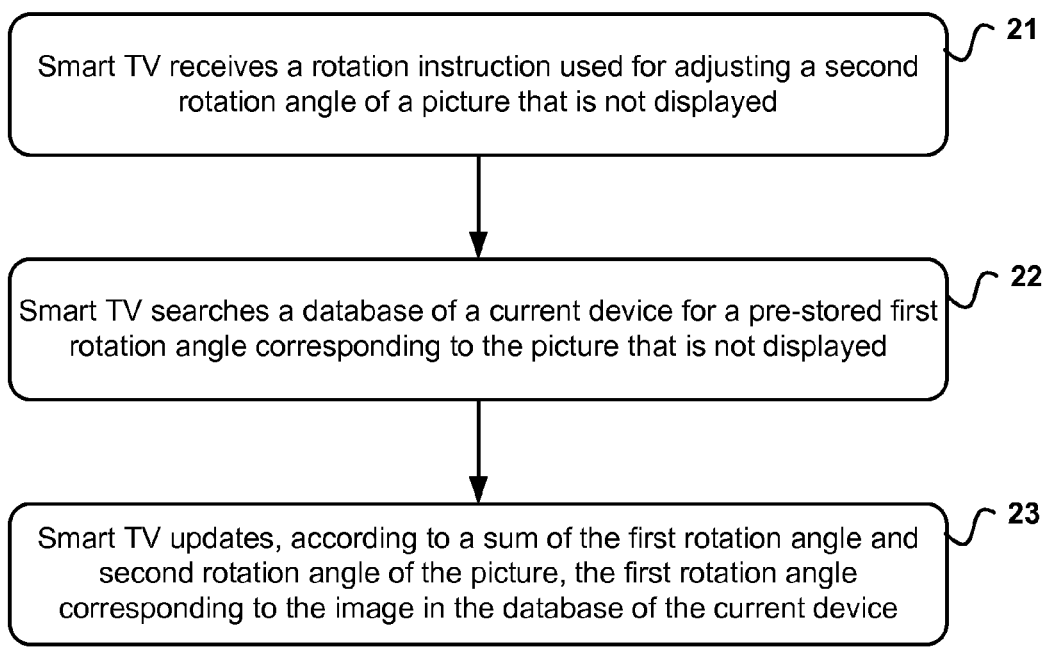
FIG. 2 is a flowchart of a picture rotation method for a picture that is not displayed according to an exemplary embodiment of the present disclosure.

FIG. 2 is a flowchart of a picture rotation method for a picture that is not displayed according to an exemplary embodiment of the present disclosure, where the exemplary embodiment of the present disclosure is described by using an example in which a smart TV serves as a current display device, and as shown in FIG. 2, the process may include:

Step 21: A smart TV receives a rotation instruction to adjust a second rotation angle of a picture that is not displayed.

Step 22: The smart TV searches a database of a current device for a pre-stored first rotation angle corresponding to the picture that is not displayed.

For example, the first rotation angle of a picture that is not rotated may be set to 0° by default.

Step 23: The smart TV updates, according to a sum of the first rotation angle and the second rotation angle of the picture, the first rotation angle corresponding to the image in the database of the current device.

Figure 3:
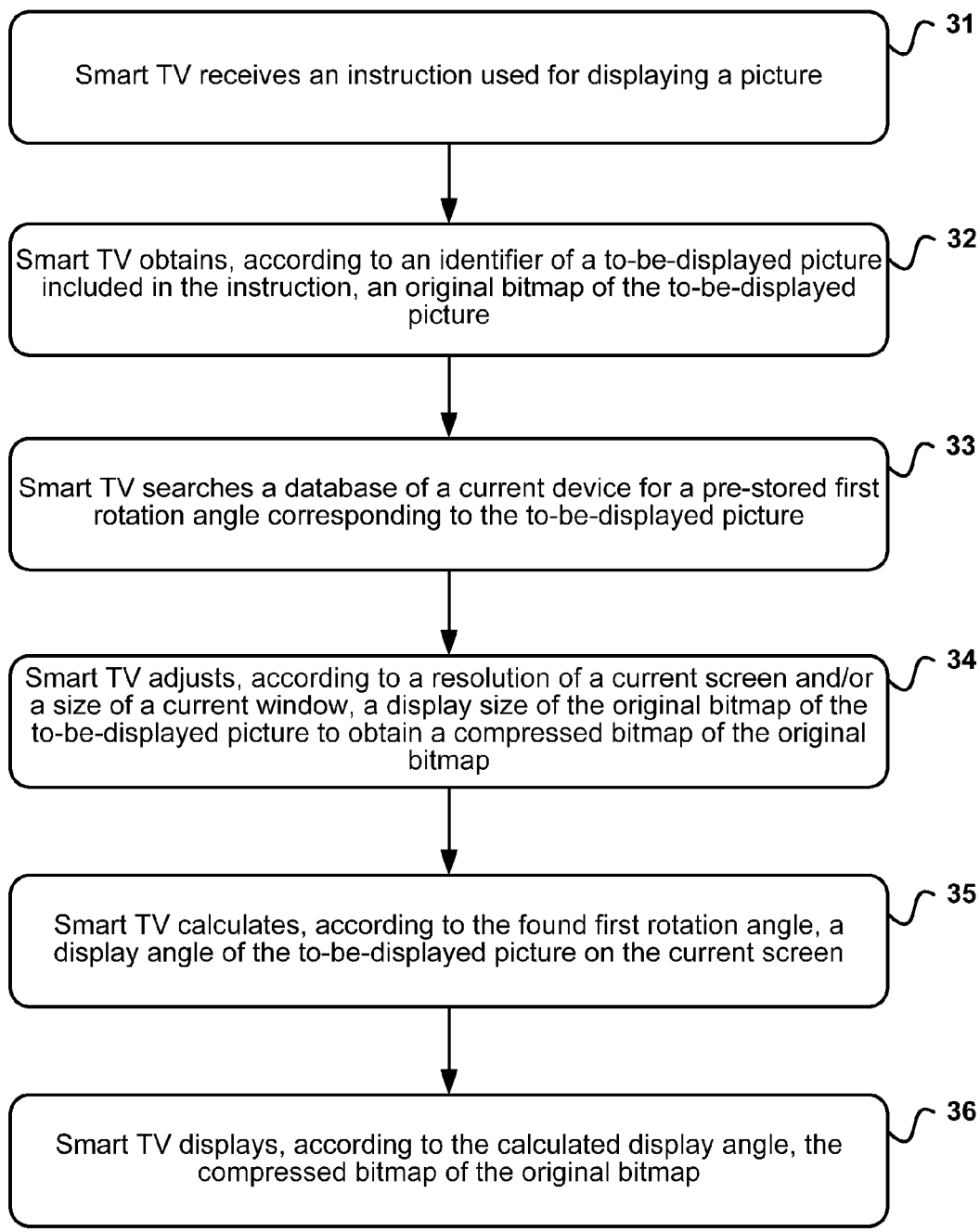
FIG. 3 is a flowchart of an image display method according to an exemplary embodiment of the present disclosure.

After image rotation is performed on the picture that is not displayed, execution of the image display method according to the exemplary embodiment of the present disclosure may be continued. FIG. 3 is a flowchart of an image display method according to an exemplary embodiment of the present disclosure, and as shown in FIG. 3, the process may include:

Step 31: A smart TV receives an instruction display a picture.

Step 32: The smart TV obtains, according to an identifier of a to-be-displayed picture included in the instruction, an original bitmap of the to-be-displayed picture.

For example, the smart TV may execute the following code for displaying an image:
mPictureOrientation=mCursor.getInt(mCursor.getColumnIndex(MediaDataContract.Media.Columns.ORIENTATION));

where mCursor includes information related to the image and obtained from a database of a current device (e.g., the smart TV).

Step 33: The smart TV searches a database of the current device for a pre-stored first rotation angle corresponding to the to-be-displayed picture.

Step 34: The smart TV adjusts, according to a resolution of a current screen and/or a size of a current display window on the current screen, a display size of the original bitmap of the to-be-displayed picture to obtain a compressed bitmap of the original bitmap.

Step 35: The smart TV calculates, according to the first rotation angle, a display angle of the to-be-displayed picture on the current screen.

For example, the smart TV may execute the following code for calculating a display angle:

```
int rotatedDegree= mPictureOrientation + (mRotateFactor % 4) * 90;
int newOrientation = rotatedDegree% 360;
if (newOrientation < 0) {
  newOrientation = (4 – Math.abs(rotatedDegree / 90)) * 90;
}
``` where mRotateFactor is a rotating factor and is increased by 1 if a key is pressed clockwise once.

Step 36: The smart TV displays, according to the calculated display angle, the compressed bitmap of the original bitmap.

For example, the smart TV may execute the following code for displaying the compressed bitmap:

matrix.postRotate(rotatedDegree);
newBmp=Bitmap.createBitmap(bitmap, 0, 0, w, h, matrix, true);
view.setAdjustViewBounds(true);
view.setMaxWidth(mDisplayWidth);
view.setMaxHeight(mDisplayHeight>h? mDisplayHeight: h);
view.setImageBitmap(newBmp);

where bitmap is a bitmap of the current window image, matrix is a Matrix object, w and h are a resolution of a display, and view is ImageView for displaying the image.

It should be noted that the foregoing code only serves as an implementation manner of the exemplary embodiment of the present disclosure, and other implementation manners that can implement the same function all fall within the protection scope of the exemplary embodiment of the present disclosure.

Figure 4:
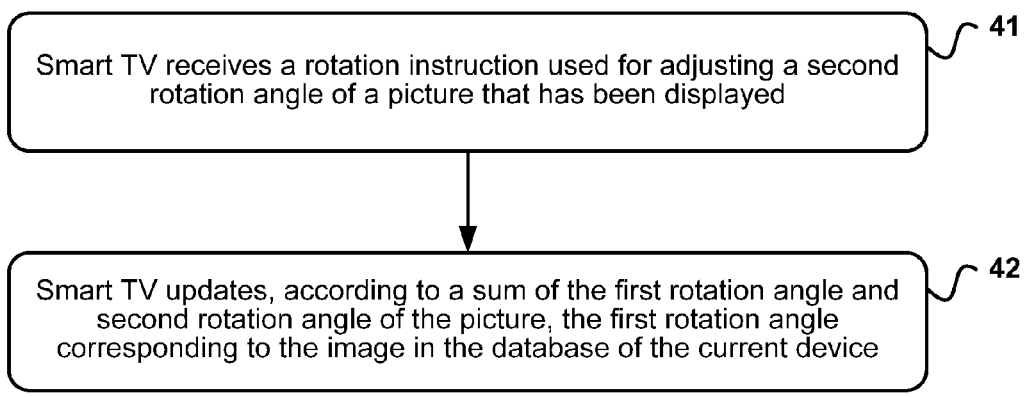
FIG. 4 is a flowchart of an image rotation method for a picture that is not displayed according to an exemplary embodiment of the present disclosure.

After the image is displayed, execution of the image rotation method according to the exemplary embodiment of the present disclosure may be continued. FIG. 4 is a flowchart of an image rotation method for a picture that has been displayed according to an exemplary embodiment of the present disclosure, where the exemplary embodiment of the present disclosure is described by using an example in which a smart TV serves as a current display end, and as shown in FIG. 4, the process may include:

Step 41: A smart TV receives a rotation instruction to adjust a second rotation angle of a picture that has been displayed.

For example, the picture that has been displayed may be a picture that is completely displayed at a calculated display angle, where the display angle may be the display angle calculated in the foregoing step 35.

Step 42: The smart TV updates, according to a sum of the first rotation angle and second rotation angle of the picture, the first rotation angle corresponding to the image in the database of the current device.

For example, in the foregoing step 23 and the foregoing step 42, a code for updating the corresponding first rotation angle in the database of the current device may be:

ContentResolver cr=Activity.this.getContentResolver( );
ContentValues cv=new ContentValues(1);
cv.put(MediaDataContract.Media.Columns.ORIENTATION, newOrientation);
cr.update(uri, cv, null, null);

where uri is an identifier of the current image.

It should be noted that the foregoing code only serves as an implementation manner of the exemplary embodiment of the present disclosure, and other implementation manners that can implement the same function all fall within the protection scope of the exemplary embodiment of the present disclosure.

Figure 5:
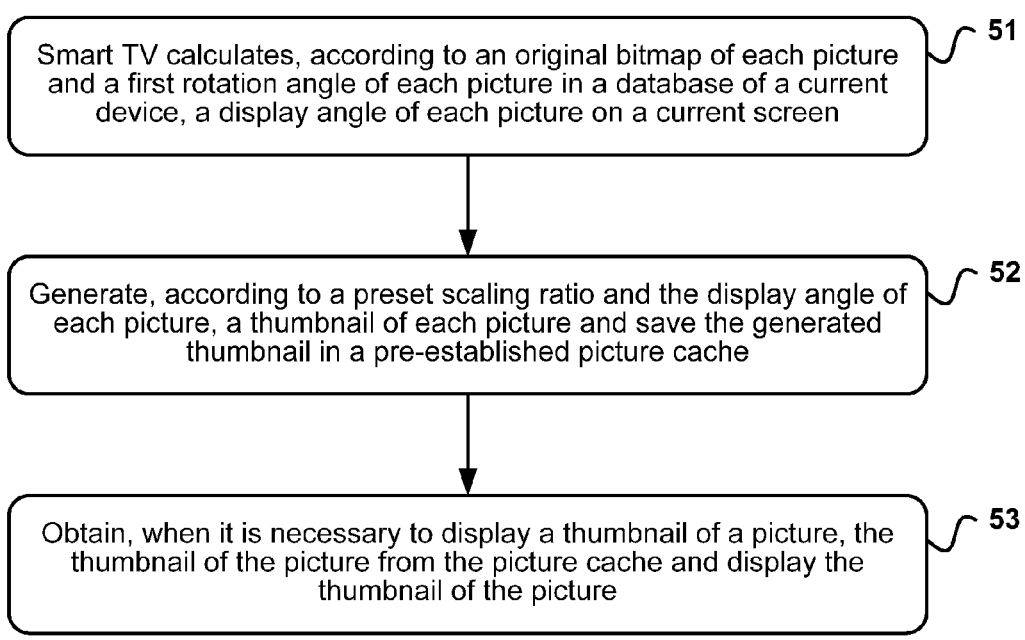
FIG. 5 is a flowchart of a method for generating or updating a thumbnail according to an exemplary embodiment of the present disclosure.

In any one of the foregoing step 21 to step 42, the smart TV generates or updates a thumbnail of each picture. FIG. 5 is a flowchart of a method for generating or updating a thumbnail according to an exemplary embodiment of the present disclosure, and as shown in FIG. 5, the process may include:

Step 51: The smart TV calculates, according to an original bitmap of each picture and a first rotation angle of each picture in a database of a current device, a display angle of each picture on a current screen.

Step 52: Generate, according to a preset scaling ratio and the display angle of each picture, a thumbnail of each picture and save the generated thumbnail in a pre-established picture cache.

Step 53: Obtain, when it is necessary to display a thumbnail of a picture, the thumbnail of the picture from the picture cache and display the thumbnail of the picture.

For example, a code for implementing a thumbnail cache mechanism according to the exemplary embodiment of the present disclosure may be:

```
public void addBitmapToMemoryCache(Uri key, Bitmap bitmap) {
  mMemoryCache.put(key, bitmap);
}
public Bitmap getBitmapFromMemCache(Uri key) {
  return mMemoryCache.get(key);
}
public void removeBitmapFromMemoryCache(Uri key) {
  mMemoryCache.remove(key);
}
``` where mMemoryCache is an LruCache<Uri, Bitmap> object.

It should be noted that the foregoing code only serves as an implementation manner of the exemplary embodiment of the present disclosure, and other implementation manners that can implement the same function all fall within the protection scope of the exemplary embodiment of the present disclosure.

In view of the foregoing technical solutions, after an instruction display a picture is received, an original bitmap of a to-be-displayed picture is obtained, and a database of a current device is searched for a pre-stored first rotation angle corresponding to the to-be-displayed picture; in the exemplary embodiments of the present disclosure, the original bitmap of the to-be-displayed picture is first compressed, so as to reduce a size of the to-be-displayed picture, and when later it turns out the electronic device needs to perform a rotation operation on the to-be-displayed picture, the compressed bitmap is directly rotated, and as compared with a manner of directly rotating the original bitmap in the current technology, the exemplary embodiments of the present disclosure effectively save the memory occupied in processes of loading, rotating, and displaying a picture and increase speeds of loading, rotating, and displaying the picture; further, in the exemplary embodiments of the present disclosure, the compressed bitmap of the original bitmap is rotated according to initial direction information of the to-be-displayed picture and the first rotation angle, and the picture is displayed after the rotation operation. Hence, the rotation operation is performed on the compressed bitmap of the original bitmap, thereby avoiding phenomenon of consuming a lot of memory as the rotation operation is performed on the original bitmap in the current technology. Further, in the exemplary embodiments of the present disclosure, the first rotation angle is a parameter for adjusting, on the basis of a direction of a to-be-displayed picture, a display direction of the picture, the first rotation angle is stored in the database of the current device and does not replace an attribute of the to-be-displayed picture, and in this way, no matter how a user rotates a display direction of each picture, the attribute of the picture would not be modified, and therefore, an original resolution of the picture would not be reduced; hence a more flexible picture display method is provided on the premise of ensuring an original definition and resolution of the picture, thereby improving a displaying rate, lowering memory consumption, and reducing a memory occupation rate.

Figure 6:
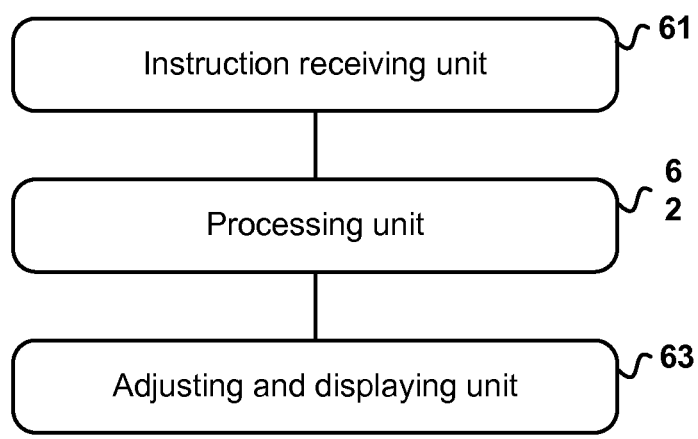
FIG. 6 is a flowchart of a picture display apparatus according to an exemplary embodiment of the present disclosure.

On the basis of the same technical concept, FIG. 6 is a flowchart of a picture display apparatus according to an exemplary embodiment of the present disclosure, and as shown in FIG. 6, the apparatus specifically includes:

an instruction receiving unit 61, configured to receive an instruction display a picture;

a processing unit 62, configured to obtain, according to an identifier of a to-be-displayed picture included in the instruction, an original bitmap of the to-be-displayed picture and search a database of a current device for a pre-stored first rotation angle corresponding to the to-be-displayed picture; and an adjusting and displaying unit 63, configured to adjust, according to a resolution of a current screen and/or a size of a current window, a display size of the original bitmap of the to-be-displayed picture to obtain a compressed bitmap of the original bitmap; and display, according to the first rotation angle, the compressed bitmap of the original bitmap.

The apparatus further includes:

a database maintaining unit, configured to update, for a picture that has been displayed, the first rotation angle corresponding to the picture in the database of the current device after receiving a rotation instruction to adjust a second rotation angle of the picture that has been displayed according to a sum of the first rotation angle and second rotation angle of the picture; search, for a picture that is not displayed, the database of the current device for a pre-stored first rotation angle corresponding to the picture after receiving a rotation instruction to adjust a second rotation angle of the picture that is not displayed, and update, according to a sum of the first rotation angle and second rotation angle of the picture, the first rotation angle corresponding to the picture in the database of the current device.

The adjusting and displaying unit 63 is further configured to perform, according to a calculated display angle, on a picture rotation operation the compressed bitmap of the original bitmap; adjust, according to the resolution of the current screen and/or the size of the current window, a display size of the compressed bitmap of the original bitmap after the rotation operation, so as to obtain an adaptive window bitmap; and display the adaptive window bitmap.

The apparatus further includes:

a thumbnail processing unit, configured to, on the basis of an original bitmap of each picture and a preset scaling ratio, generate, according to a first rotation angle of each picture in the database of the current device, a thumbnail of each picture and save the generated thumbnail in a pre-established picture cache.

The thumbnail processing unit is further configured to obtain, when it is necessary to display a thumbnail of a picture, the thumbnail of the picture from the picture cache and display the thumbnail of the picture.

The present disclosure is described with reference to the method and device (system) according to exemplary embodiments of the present disclosure, and flowcharts and/or block diagrams of a computer program product. It should be understood that each procedure and/or block in the flowcharts and/or block diagrams, and a combination of a procedure and/or block in the flowcharts and/or block diagrams may be implemented by computer program instructions. The computer program instructions may be provided for a processor of a general-purpose computer, a dedicated computer, a built-in processor, or another programmable data processing device to generate a machine, so that an instruction executed by a processor of a computer or another programmable data processing device generates an apparatus for implementing a function specified in one or a plurality of procedures in the flowcharts and/or one or a plurality of blocks in the block diagrams.

The computer program instructions may also be stored in a computer readable memory that can guide a computer or another programmable data processing device to work in a specified manner, so that the instructions stored in the computer readable memory generate a product including an instruction apparatus, where the instruction apparatus implements a function specified in one or a plurality of procedures in the flowcharts and/or one or a plurality of blocks in the block diagrams.

The computer program instructions may also be installed to a computer or another programmable data processing device, so that a serials of operation steps are performed in the computer or the another programmable device to generate processing implemented by the computer. In this way, an instruction executed in the computer or the another programmable device provides a step for implementing a function specified in one or a plurality of procedures in the flowcharts and/or one or a plurality of blocks in the block diagrams.

Though exemplary embodiments of the present disclosure are described, a person skilled in the art can make changes and modifications to the embodiments once knowing basic creative concepts. Therefore, the accompanying claims intend to be construed as including the exemplary embodiments and all changes and modifications falling within the scope of the present disclosure.

Obviously, a person skilled in the art may make various modifications and variations of the present disclosure without departing from the spirit and scope of the present disclosure. Therefore, the present disclosure intends to include the modifications and variations if the modifications and variations of the present disclosure fall within the scope of the claims of the present disclosure and equivalent technologies.

The invention claimed is:

1. A method for picture display, comprising:
receiving, by an electronic device, an instruction to display a target picture, the instruction including information identifying the target picture;
loading, by the electronic device, an original bitmap of the target picture according to the information identifying the target picture;
obtaining, by the electronic device, a first rotation angle corresponding to the target picture;
adjusting, by the electronic device according to a predetermined resolution associated with the electronic device, a display size of the original bitmap of the target picture to obtain a compressed bitmap of the original bitmap;
rotating, by the electronic device, the compressed bitmap of the original bitmap according to the first rotation angle;
adjusting, by the electronic device, according to the predetermined resolution associated with the electronic device, a display size of the rotated compressed bitmap so as to obtain an adaptive window bitmap; and
displaying, by the electronic device, the adaptive window bitmap.

2. The method according to claim 1, wherein the electronic device is a smart TV, and
the predetermined resolution comprises a resolution of a screen of the electronic device or a resolution of a display window on the screen of the electronic device.

3. The method according to claim 1, further comprising, when the target picture has been displayed:
receiving, by the electronic device, a rotation instruction to adjust the target picture with a second rotation angle of the target picture;
determining, by the electronic device, a summation of the first rotation angle and the second rotation angle of the target picture; and
updating, by the electronic device, the first rotation angle with the summation.

4. The method according to claim 1, further comprising, when the target picture has not been displayed:
receiving, by the electronic device, a rotation instruction to adjust the target picture with a second rotation angle;
searching, by the electronic device, a database for a pre-stored angle as the first rotation angle corresponding to the target picture;
determining, by the electronic device, a summation of the first rotation angle and the second rotation angle of the target picture; and
updating, by the electronic device, the first rotation angle with the summation.

5. The method according to claim 1, further comprising:
generating, by the electronic device, a thumbnail of the target picture according to the first rotation angle and based on the original bitmap and a preset scaling ratio; and
saving, by the electronic device, the thumbnail in a pre-established picture cache of the electronic device.

6. The method according to claim 5, further comprising:
loading, by the electronic device, the thumbnail of the target picture from the pre-established picture cache; and
displaying, by the electronic device, the thumbnail of the target picture.

7. An electronic apparatus for picture display, comprising:
a memory storing a set of instructions:
a processor in communication with the memory,
wherein, when the processor executes the set of instructions, the processor is configured to cause the electronic apparatus to:
receive an instruction to display a target picture, the instruction including information identifying the target picture;
load an original bitmap of the target picture according to the information identifying the target picture;
obtain a first rotation angle corresponding to the target picture;
adjust, according to a predetermined resolution associated with the electronic apparatus, a display size of the original bitmap of the target picture to obtain a compressed bitmap of the original bitmap;
rotate the compressed bitmap according to the first rotation angle;
adjust a display size of the rotated compressed bitmap according to the predetermined resolution so as to obtain an adaptive window bitmap; and
display the adaptive window bitmap.

8. The electronic apparatus according to claim 7, wherein the predetermined resolution comprises a resolution of a screen of the electronic apparatus or a resolution of a display window on the screen of the electronic apparatus.

9. The electronic apparatus according to claim 7, wherein, when the processor executes the set of instructions, the processor is further configured to cause the electronic apparatus to update the first rotation angle.

10. The electronic apparatus according to claim 7, wherein, when the processor executes the set of instructions and the target picture has been displayed, the processor is further configured to cause the electronic apparatus to:
receive a rotation instruction to adjust the target picture with a second rotation angle of the target picture;
determine a summation of the first rotation angle and the second rotation angle of the target picture; and
update the first rotation angle with the summation.

11. The electronic apparatus according to claim 7, wherein, when, when the processor executes the set of instructions and the target picture has not been displayed, the processor is further configured to cause the electronic apparatus to:
receive a rotation instruction to adjust the target picture with a second rotation angle;
search a database for a pre-stored angle as the first rotation angle corresponding to the target picture;
determine a summation of the first rotation angle and the second rotation angle of the target picture; and
update the first rotation angle with the summation.

12. The electronic apparatus according to claim 7, wherein, when the processor executes the set of instructions, the processor is further configured to cause the electronic apparatus to:
generate a thumbnail of the target picture according to the first rotation angle and based on the original bitmap and a preset scaling ratio; and
save the thumbnail in a pre-established picture cache of the electronic apparatus.

13. The electronic apparatus according to claim 12, wherein, when the processor executes the set of instructions, the processor is further configured to cause the electronic apparatus to:
load the thumbnail of the target picture from the pre-established picture cache; and
display the thumbnail of the target picture.

14. A non-transitory processor-readable storage medium, comprising a set of instructions for picture display, wherein, when a processor of an electronic device executes the set of instructions, the set of instructions directs the processor to perform actions of:
- receiving an instruction to display a target picture including information identifying the target picture;
- loading an original bitmap of the target picture according to the information identifying the target picture;
- obtaining from a database a first rotation angle corresponding to the target picture;
- adjusting, according to a predetermined resolution associated with the electronic device, a display size of the original bitmap of the target picture to obtain a compressed bitmap of the original bitmap;
- rotating the compressed bitmap of the original bitmap according to the first rotation angle;
- adjusting, according to the predetermined resolution associated with the electronic device, a display size of the rotated compressed bitmap so as to obtain an adaptive window bitmap; and
- displaying the adaptive window bitmap.

15. The non-transitory processor-readable storage medium according to claim 14, wherein the electronic device is a smart TV; and
- the predetermined resolution comprises a resolution of a screen of the electronic device or a resolution of a display window on the screen of the electronic device.

16. The non-transitory processor-readable storage medium according to claim 14, wherein when the target picture has been displayed, the set of instructions further directs the processor to perform acts of:
- receiving a rotation instruction to adjust the target picture with a second rotation angle of the picture;
- determining a summation of the first rotation angle and second rotation angle of the image; and
- updating the first rotation angle with the summation.

17. The non-transitory processor-readable storage medium according to claim 16, wherein when the target picture has not been displayed, the set of instructions further directs the processor to perform acts of:
- receiving a rotation instruction to adjust the target picture with a second rotation angle;
- searching the database of the current device for the first rotation angle corresponding to the target picture when the target picture has not been displayed;
- determining a summation of the first rotation angle and second rotation angle of the image when the target picture has been displayed; and
- updating the first rotation angle with the summation.

* * * * *